(No Model.)
T. J. HOGAN.
DISK METER.
No. 583,474. Patented June 1, 1897.
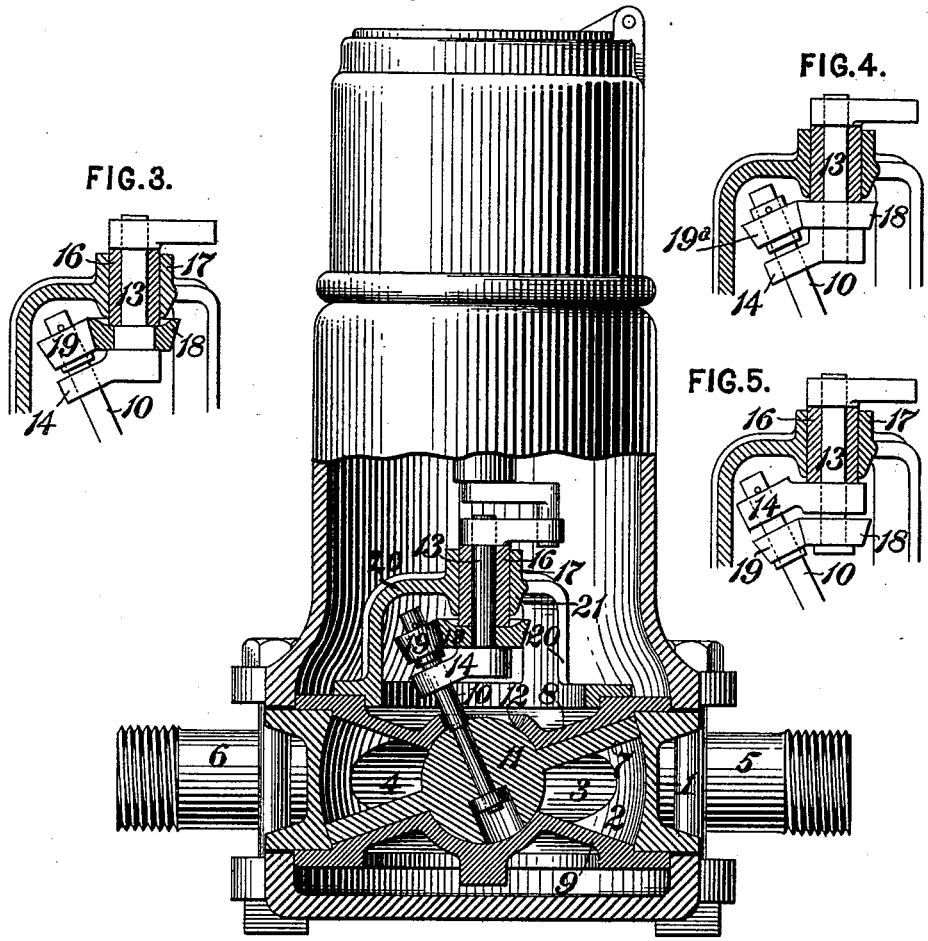
FIG. 1.
FIG. 3.
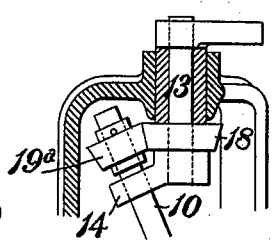
FIG. 4.
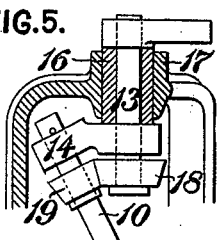
FIG. 5.
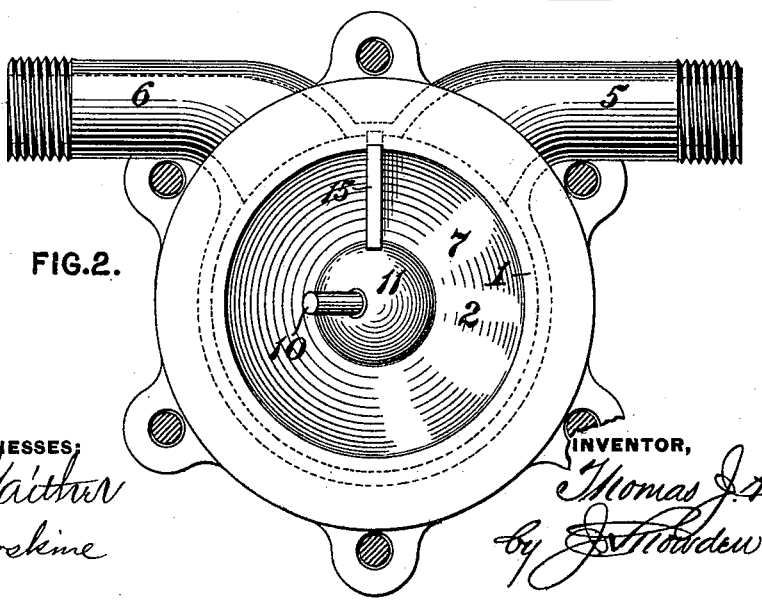
FIG. 2.
WITNESSES:
F. E. Gaither
W. H. Erskine
INVENTOR,
Thomas J. Hogan
by Snowden Bell
Att'y.
THE NORRIS PETERS CO., PHOTO-LITHO., WASHINGTON, D. C.

UNITED STATES PATENT OFFICE.

THOMAS J. HOGAN, OF PITTSBURG, PENNSYLVANIA, ASSIGNOR TO THE PITTSBURG METER COMPANY, OF SAME PLACE.

DISK METER.

SPECIFICATION forming part of Letters Patent No. 583,474, dated June 1, 1897.

Application filed July 17, 1896. Serial No. 599,470. (No model.)

*To all whom it may concern:*

Be it known that I, THOMAS J. HOGAN, a citizen of the United States, residing at Pittsburg, in the county of Allegheny and State of Pennsylvania, have invented or discovered a certain new and useful Improvement in Disk Meters, of which improvement the following is a specification.

The object of my invention is to provide an improvement in oscillating-disk meters; and to this end it consists in new and improved means for guiding and controlling the inclination of the disk and its stem.

In the accompanying drawings, which illustrate applications of my invention, Figure 1 is a central longitudinal section through a disk meter provided with my improvement; Fig. 2, a plan view of the disk-chamber and disk, the upper casing being removed; Figs. 3, 4, and 5, views, partly in section and partly in elevation, showing modifications of my improvement.

My improvement is specially applicable to oscillating-disk meters of the class in which a centrally-pivoted disk is fitted and adapted to oscillate in a chamber the ends of which are closed by frustums of cones, against which the opposite sides of the disk bear as it oscillates. A central stem secured to the disk extends through one of the conical heads, and its outer end, which moves in a circle or has a motion of nutation, is adapted to operate a shaft by which motion is given to the registering mechanism.

As shown in Fig. 1 of the drawings, the disk-chamber 2 is formed in the main casing 1 and communicates by ports 3 and 4, respectively, with the inlet and outlet nozzles 5 and 6. The disk 7 is formed integral with or secured to a central ball 11, which is fitted in bearings formed on the heads 8 and 9, and a stem 10, secured to the ball 11, passes through an opening 12 in one of the heads. The disk is adapted to oscillate so that the lines of contact of its opposite sides or faces with the heads 8 and 9 are continually changing position, but rotation of the disk is prevented by the fixed partition 15, which is located between the inlet and outlet ports 3 and 4 and passes through a slot in the disk.

A rotary shaft 13 in line with the axis of the disk-chamber is provided with a driving-arm 14, which extends laterally from the shaft into position to be operated by the circular movement of the end portion of the stem 10 as the disk 7 is oscillated by the action of the fluid passing through the disk-chamber. This general construction and method of operation of a disk meter are not of my invention, but are shown and described for the purpose of illustrating an application of my invention which is not limited to the particular device shown and described.

In motors, meters, or pumps constructed and operating in substantially the same manner as the device shown in the drawings the angle at which the disk 7 is held depends upon and is controlled by the angle which the stem 10 makes with the shaft 13 and the axis of the disk-chamber, and this angle should be such that the opposite sides or faces of the disk make contact in the same plane with the opposite conical heads of the disk-chamber. My improvement provides simple, inexpensive, and efficient means for effecting this purpose.

An adjustable bushing 16 surrounds the shaft 13 and is mounted in a fixed bearing 17, within which it may be moved longitudinally to effect adjustment of the shaft 13. The bushing may be fixed in place by a set-screw when adjusted or by other suitable means.

As shown in Figs. 1, 3, and 4, the driving-arm 14 is secured to the inner or lower end of the shaft 13, and between the driving-arm and the end of the bushing 16 I provide a roller or wheel 18, which is loosely mounted on the shaft 13—that is, this wheel or roller is so mounted that it may rotate freely on the shaft 13 with a minimum of friction. The position, form, and dimensions of the wheel or roller 18 are such that it is adapted to engage with and form a roller-bearing for a pulley, roller, or wheel 19, mounted to rotate on the disk-stem 10, as shown in Figs. 1 and 3, or to form a roller-bearing for an integral or fixed head 19ª on the disk-stem 10, as shown in Fig. 4.

In the construction shown in Fig. 5 the roller-bearing 18 on the shaft 13 is located below the driving-arm 14 or nearer the end of the shaft, and the driving-arm is located between the roller-bearing 18 and the bushing 16. The roller or head 19 (shown in Fig. 5)

may be either fixed or loose on the stem 10. The engaging surfaces of the roller 18 and the roller or head 19 or 19ª are preferably formed at such an angle that their line of contact, if produced, will pass through the center of the ball and disk, which is the point of intersection of the axes of the stem 10 and the shaft 13. By means of this construction as the outer end of the stem 10 is rotated it is held at the desired angle to the axis of the shaft 13, and the friction of the parts will be very slight on account of the rolling action between the roller on the stem and the roller on the shaft.

My improvement requires only the provision of two small inexpensive rollers, which may be applied directly to an ordinary form of stem and shaft without the necessity of forming new or additional bearings, since these parts are usually formed cylindrical and with sufficient smoothness and accuracy. The total length of the shaft 13 may be required to be greater than is necessary in constructions in which my improvement is not employed, but in most constructions the length of the shaft 13 is usually sufficiently greater than the length of its bearing to permit the application of my improvement thereto without making any changes.

Where a bushing for the shaft 13 is employed, if the length of the shaft does not sufficiently exceed the length of the bearing the length of the bushing may be somewhat reduced to make room for the roller. Whether applied to new or old constructions it is only necessary that the shaft should be made a little longer than its bearing. In Fig. 3, however, I have shown a construction in which the bearing on which the roller 18 rotates is made larger than the upper portion of the shaft. In Fig. 5 the relative positions of the rollers and the crank-arm are different from those shown in the other figures, but this involves no other change in construction.

I am aware that a roller interposed between the disk-stem and a fixed bearing has been employed, but this involves the formation of a bearing-surface additional to the usual simple parts of the driving mechanism, the necessity for which is obviated by my improvement. The formation of an additional bearing on a fixed part 21 of the frame or support 20 or the provision of a fixed bearing connected thereto involves additional expense and complication of construction and adjustment not required by my improvement.

To those skilled in the art it is known that in devices of this kind simplicity, inexpensiveness, and facility for adjustment are features of great importance, and that any reduction in the friction of the mechanism increases its sensitiveness and efficiency.

I claim as my invention and desire to secure by Letters Patent—

1. The combination, in a disk meter, of a disk, a stem secured to the disk, a shaft operated by the stem and having its axis in line with the center of the disk, and a roller-bearing interposed between the stem and the shaft and bearing on the shaft, substantially as set forth.

2. The combination, in a disk meter, of a stem secured to the disk and operated thereby, a shaft whose axis is in line with the center of the disk and which is operated by the stem, and a roller-bearing mounted on the shaft and interposed between the shaft and the stem, substantially as set forth.

3. The combination, in a disk meter, of a stem secured to the disk and operated thereby, a shaft having its axis in line with the center of the disk and which is operated by the stem, a roller on the shaft, and a roller on the stem engaging with the roller on the shaft, substantially as set forth.

4. The combination, in a disk meter, of a disk, a stem secured to the disk and operated thereby, a shaft, an arm on the shaft which is in engagement with and actuated by the stem, and a roller-bearing between the shaft and the stem and engaging with the shaft, substantially as set forth.

In testimony whereof I have hereunto set my hand.

THOMAS J. HOGAN.

Witnesses:
J. SNOWDEN BELL,
F. E. GAITHER.